(12) United States Patent
Leathorn et al.

(10) Patent No.: US 12,545,079 B2
(45) Date of Patent: Feb. 10, 2026

(54) RELIEF VENT FOR HEATING VENTILATION AND AIR CONDITIONING SYSTEM

(71) Applicant: GM GLOBAL TECHNOLOGY OPERATIONS LLC, Detroit, MI (US)

(72) Inventors: Steven Jay Leathorn, Fort Gratiot, MI (US); Angel R. Munoz, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 423 days.

(21) Appl. No.: 18/158,044

(22) Filed: Jan. 23, 2023

(65) Prior Publication Data

US 2024/0246392 A1    Jul. 25, 2024

(51) Int. Cl.
*B60H 1/00*    (2006.01)
*B60H 1/34*    (2006.01)

(52) U.S. Cl.
CPC .......... *B60H 1/00857* (2013.01); *B60H 1/34* (2013.01)

(58) Field of Classification Search
CPC ..... F16K 1/00; F16K 15/021; B60H 1/00857; B60H 1/34
USPC ......................................................... 454/75
See application file for complete search history.

(56) References Cited

U.S. PATENT DOCUMENTS

| | | | |
|---|---|---|---|
| 2013/0067882 A1* | 3/2013 | West ................. | F02C 9/18 60/785 |
| 2017/0328316 A1* | 11/2017 | Van Lant ............ | F02B 39/16 |
| 2023/0175603 A1* | 6/2023 | Bludau .............. | F16K 25/005 137/540 |

FOREIGN PATENT DOCUMENTS

| | | | | |
|---|---|---|---|---|
| CN | 113108099 A | * | 7/2021 | |
| WO | WO-2019060965 A1 | * | 4/2019 | ...... B01F 23/231151 |

* cited by examiner

Primary Examiner — Allen R. B. Schult
Assistant Examiner — William C Weinert
(74) Attorney, Agent, or Firm — CANTOR COLBURN LLP (57) ABSTRACT

A pressure relief valve includes a housing configured for installation into a duct opening of a duct, and a diffuser installed into the housing and movable between a closed position and an opened position along a valve axis. The diffuser includes a tubular diffuser body having an inlet opening at a first end, a diffuser cap located at a second end of the tubular diffuser body to close the tubular diffuser body at the second end, and one or more outlet openings located between the inlet opening and the diffuser cap. A biasing element biases a position of the diffuser toward the closed position. When an airflow pressure in the duct exceeds a threshold, the airflow urges the diffuser toward the opened position thus allowing the airflow to exit the pressure relief valve at the one or more outlet openings.

19 Claims, 7 Drawing Sheets

RELIEF VENT FOR HEATING VENTILATION AND AIR CONDITIONING SYSTEM

INTRODUCTION

The subject disclosure relates to heating, ventilation and air conditioning of a vehicle. In particular, the present disclosure relates to control of airflow out of vents in the vehicle. Vehicles have multiple air vents in, for example, an instrument panel of the vehicle to distribute conditioned airflow into the passenger compartment of the vehicle. These vents typically use slide levers to move one or more sets of louvers or doors inside the vent to change the side-to-side and/or up-down direction of the airflow. With styling changes to vehicle interiors, the use of slim profile vents is increasing in usage. The use of such slim profile vents, however, may increase a resistance in the system, thus reducing an amount of airflow into the cabin. It is desired to reduce this resistance in order to improve the airflow into the vehicle cabin and quickly condition the airflow.

SUMMARY

In one exemplary embodiment, a pressure relief valve includes a housing configured for installation into a duct opening of a duct, and a diffuser installed into the housing and movable between a closed position and an opened position along a valve axis. The diffuser includes a tubular diffuser body having an inlet opening at a first end, a diffuser cap located at a second end of the tubular diffuser body to close the tubular diffuser body at the second end, and one or more outlet openings located between the inlet opening and the diffuser cap. A biasing element biases a position of the diffuser toward the closed position. When an airflow pressure in the duct exceeds a threshold, the airflow urges the diffuser toward the opened position thus allowing the airflow to exit the pressure relief valve at the one or more outlet openings.

In addition to one or more of the features described herein, the biasing element is a spring located between the tubular diffuser body and the housing.

In addition to one or more of the features described herein, the biasing element is a flexible biasing tab extending from the tubular diffuser body and interactive with the housing.

In addition to one or more of the features described herein the biasing element is a biasing ring located between the housing and the tubular diffuser body having one or more compressible portions.

In addition to one or more of the features described herein, a seal ring is operably connected to the duct and the housing.

In another exemplary embodiment, a heating, ventilation and air conditioning (HVAC) system of a vehicle includes an HVAC unit, a primary duct operably connected to the HVAC unit, a vent operably connected to the HVAC unit and configured to convey an airflow from the HVAC unit into an occupant compartment of the vehicle via the primary duct, and a pressure relief valve located along the primary duct. The pressure relief valve is configured to open when a pressure of the airflow in the primary duct exceeds a threshold to divert a portion of the airflow through the pressure relief valve. The pressure relief valve includes a housing installed into a duct opening, and a diffuser installed into the housing and movable between a closed position and an opened position along a valve axis. The diffuser includes a tubular diffuser body having an inlet opening at a first end, a diffuser cap located at a second end of the tubular diffuser body to close the tubular diffuser body at the second end, and one or more outlet openings located between the inlet opening and the diffuser cap. A biasing element biases a position of the diffuser toward the closed position. When the pressure of the airflow exceeds the threshold, the airflow urges the diffuser toward the opened position thus allowing the airflow to exit the pressure relief valve at the one or more outlet openings.

In addition to one or more of the features described herein, a secondary duct connects the pressure relief valve to the primary duct.

In addition to one or more of the features described herein, the pressure relief valve is located at a top pad of an instrument panel of the vehicle.

In addition to one or more of the features described herein, the biasing element is a spring located between the tubular diffuser body and the housing.

In addition to one or more of the features described herein, the biasing element is a flexible biasing tab extending from the tubular diffuser body and interactive with the housing.

In addition to one or more of the features described herein, the biasing element is a biasing ring located between the housing and the tubular diffuser body having one or more compressible portions.

In addition to one or more of the features described herein, a seal ring is operably connected to the duct and the housing.

In yet another exemplary embodiment, a vehicle includes a vehicle body defining an occupant compartment inside the vehicle, and a heating, ventilation and air conditioning (HVAC) system. The HVAC system includes an HVAC unit, a primary duct operably connected to the HVAC unit, a vent operably connected to the HVAC unit and configured to convey an airflow from the HVAC unit into the occupant compartment of the vehicle via the primary duct, and a pressure relief valve located along the primary duct. The pressure relief valve is configured to open when a pressure of the airflow in the primary duct exceeds a threshold to divert a portion of the airflow through the pressure relief valve. The pressure relief valve includes a housing installed into a duct opening, and a diffuser installed into the housing and movable between a closed position and an opened position along a valve axis. The diffuser includes a tubular diffuser body having an inlet opening at a first end, a diffuser cap located at a second end of the tubular diffuser body to close the tubular diffuser body at the second end, and one or more outlet openings located between the inlet opening and the diffuser cap. A biasing element bias a position of the diffuser toward the closed position. When the pressure of the airflow exceeds the threshold, the airflow urges the diffuser toward the opened position thus allowing the airflow to exit the pressure relief valve at the one or more outlet openings.

In addition to one or more of the features described herein, a secondary duct connects the pressure relief valve to the primary duct.

In addition to one or more of the features described herein, the pressure relief valve is located at a top pad of an instrument panel of the vehicle.

In addition to one or more of the features described herein, the biasing element is a spring located between the tubular diffuser body and the housing.

In addition to one or more of the features described herein, the biasing element is a flexible biasing tab extending from the diffuser body and interactive with the housing.

In addition to one or more of the features described herein, the biasing element is a biasing ring located between the housing and the diffuser body having one or more compressible portions.

In addition to one or more of the features described herein, a seal ring is operably connected to the duct and the housing.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
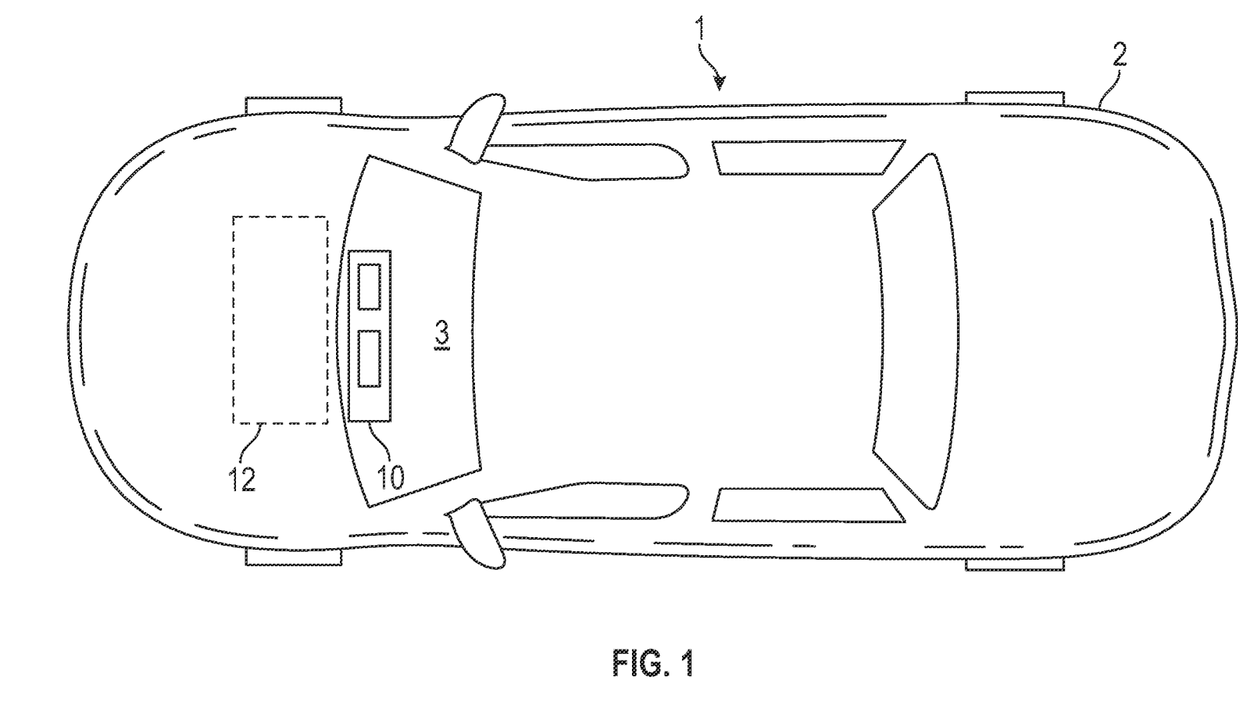
FIG. 1 is an illustration of an embodiment of a vehicle.
Figure 2:
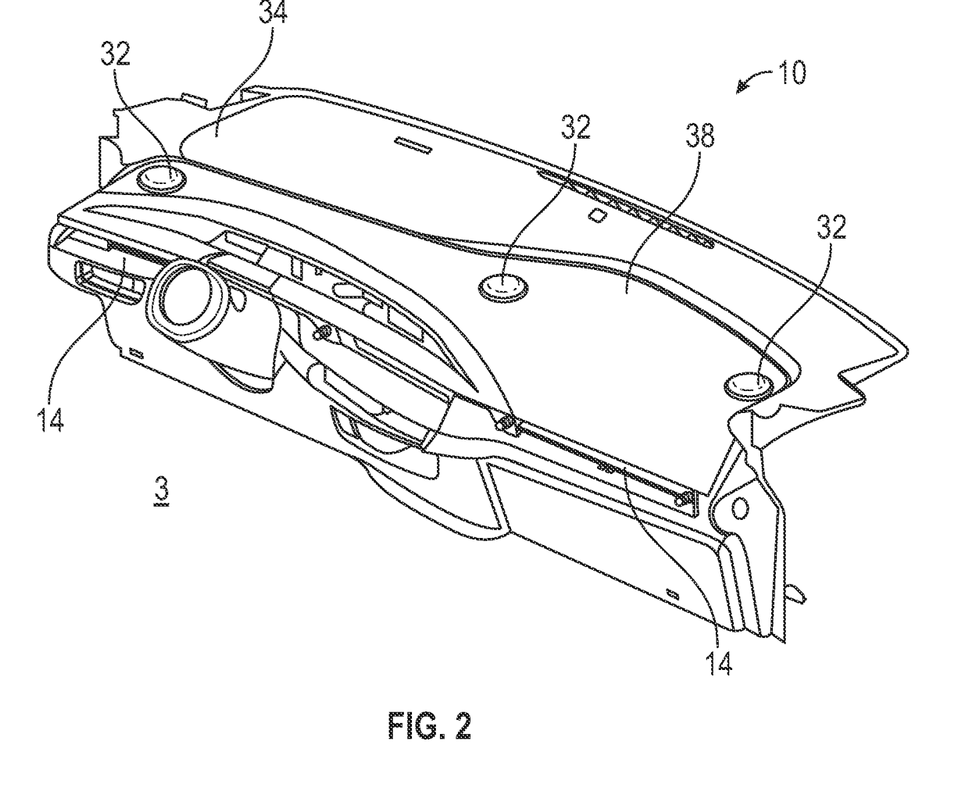
FIG. 2 is a schematic illustration of an embodiment of an instrument panel of a vehicle.

In accordance with an exemplary embodiment, illustrated in FIG. 1 is an embodiment of a vehicle 1. The vehicle 1 includes a vehicle body 2, which defines an occupant compartment 3 in an interior of the vehicle 1. As shown in FIG. 2, the occupant compartment 3 includes an instrument panel 10 extending across the occupant compartment 3. The occupant compartment 3 is conditioned to be heated or cooled via a heating, ventilation and air conditioning (HVAC) system 12 (shown in FIG. 1), with conditioned airflow into the occupant compartment 3 via one or more vent assemblies 14 located in the instrument panel 10. While the vent assemblies 14 are described herein as being located in the instrument panel 10, one skilled in the art will readily appreciate that the vent assemblies 14 may be additionally or alternatively located at other locations such as, for example, doors of the vehicle or a center console of the vehicle.

Figure 3:
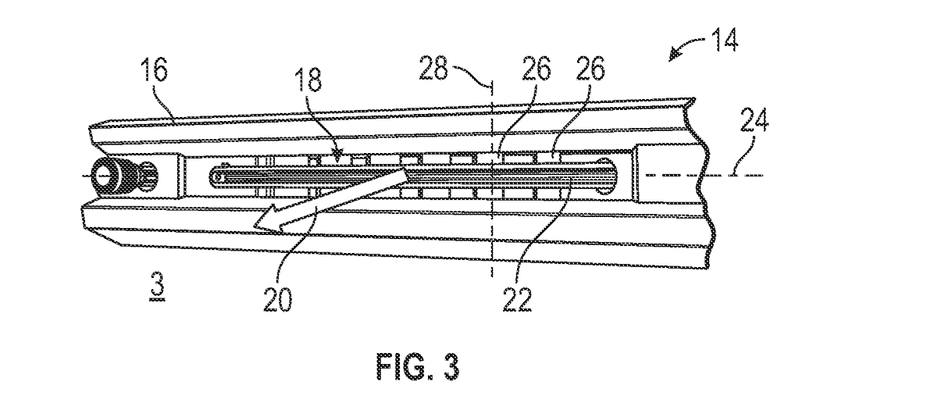
FIG. 3 is a schematic illustration of an embodiment of a vent assembly of a vehicle.

An embodiment of a vent assembly 14 is illustrated in FIG. 3. The vent assembly 14 includes a bezel 16, which defines a vent opening 18 through which the airflow 20 is directed into the occupant compartment 3. The vent assembly 14 includes a movable primary vane 22 which is rotatable about a primary vane axis 24, and a plurality of secondary vanes 26, which are each rotatable about respective secondary vane axes 28. In some embodiments, the primary vane axis 24 is a horizontal axis, such that rotation of the primary vane 22 about the primary vane axis 24 changes a direction of the airflow 20 in a first, vertical direction with respect to the passenger compartment 3. Further, in some embodiments the secondary vane axis 28 is a vertical axis, such that rotation of the secondary vanes 26 about their secondary vane axes 28 changes the direction of the airflow 20 in a second, horizontal direction. The primary vane 22 and secondary vanes 26 are moved to direct the airflow 20 in a selected or desired direction. In some embodiments, the primary vane 22 and the secondary vanes 26 are movable via operation of one or more vent knobs which are rotated to effect movement of the primary vane 22 and the secondary vanes 26. In other embodiments, other elements such as tabs connected to the primary vane 22 and the secondary vanes 26 are utilized to effect movement of the primary vane 22 and the secondary vanes 26.

Figure 4:
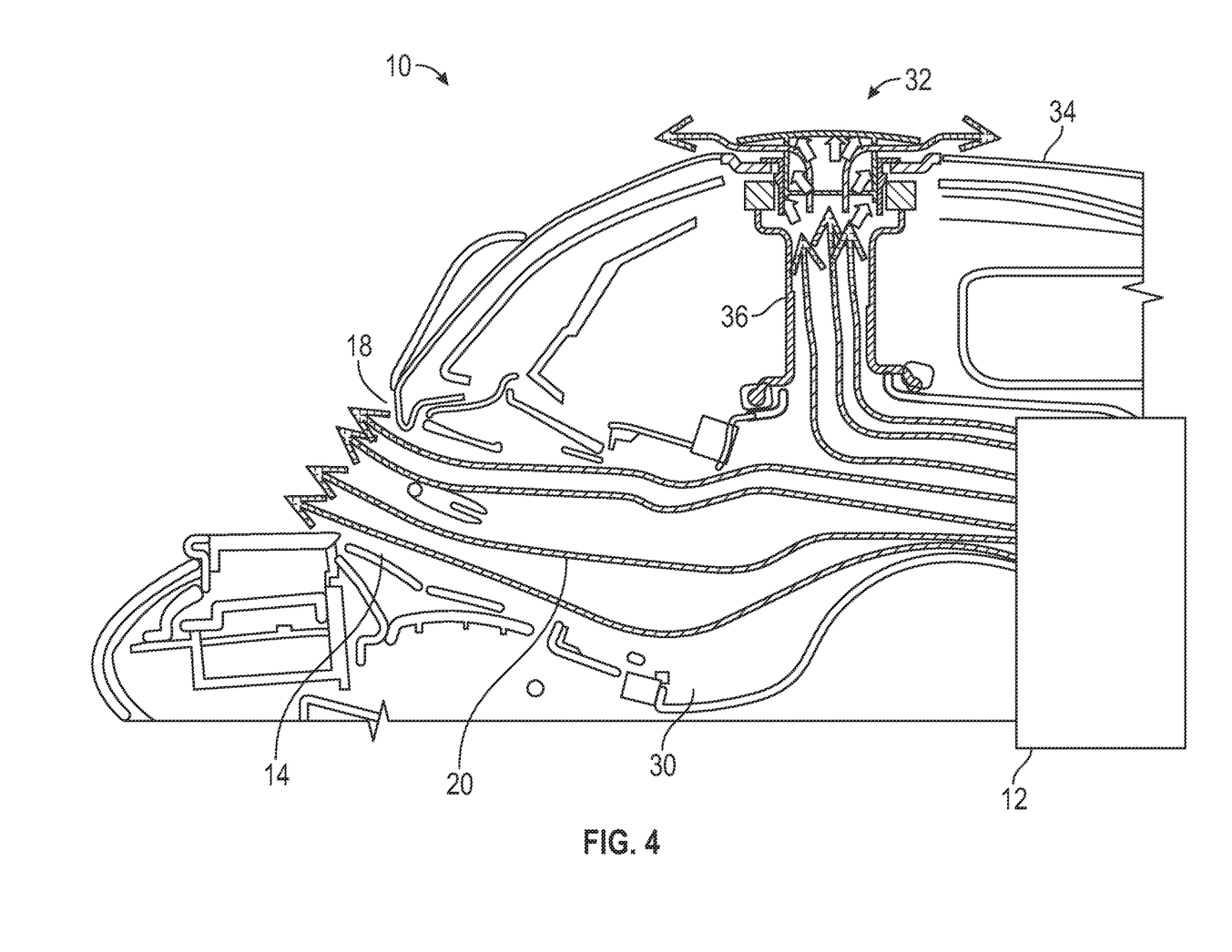
FIG. 4 is a schematic illustration of an embodiment of a vent assembly including a pressure relief valve.

Referring now to FIG. 4, the vent assembly 14 is operably connected to the HVAC system 12 along an airflow pathway between the HVAC system 12 and the vent assembly 14. In some embodiments, the airflow pathway is a primary duct 30, which directs the airflow 20 from the HVAC system 12 through the vent assembly 14. In certain operating conditions, an effective cross-sectional area of the vent opening 18 restricts the airflow 20 from entering the occupant compartment 3 at a desired rate, such that airflow pressure in the primary duct 30 increases. A pressure relief valve 32 is located along the primary duct 30, which automatically opens when a pressure of the airflow 20 in the primary duct 30 exceeds a threshold. Providing the pressure relief valve 32 allows for reduction in the cross-sectional area of the vent opening 18, and mitigates the subsequent increase in internal system pressure that occurs under certain operating conditions by opening and thereby relieving the excess pressure and resistance in the system. For example, if the cross-sectional area of the vent opening 18 is reduced by 10% to 20%, the pressure relief valves 32 may be sized to provide that same 10% to 20% of cross-sectional area for airflow therethrough.

In some embodiments, such as shown in FIG. 4 and also in FIG. 2, the pressure relief valve 32 is located at a top surface 34 of the instrument panel 10. In some embodiments, such as illustrated in FIG. 4, the pressure relief valve 32 is connected to the primary duct 30 via a secondary duct 36. While in the embodiments illustrated and described herein, the pressure relief valve 32 is located at the top surface 34 of the instrument panel 10, in other embodiments the pressure relief valve 32 may be positioned elsewhere, such as at a lower surface of the instrument panel 10 or at other locations in the vehicle 1 that may include HVAC airflow 20, such as doors, floor, center consoles or the like. Further, the embodiment of FIG. 2 includes three pressure relief valves 32 arrayed across the instrument panel 10. One skilled in the art will readily appreciate that other numbers of pressure relief valves 32, such as one, two, four, or five or more pressure relief valves 32 may be utilized. Additionally, in some embodiments the pressure relief valves 32 are located along the same primary duct 30, while in other embodiments the HVAC system 12 includes multiple primary ducts 30, and each primary duct 30 has a corresponding pressure relief valve 32 located along and connected to each primary duct 30.

Figure 5A:
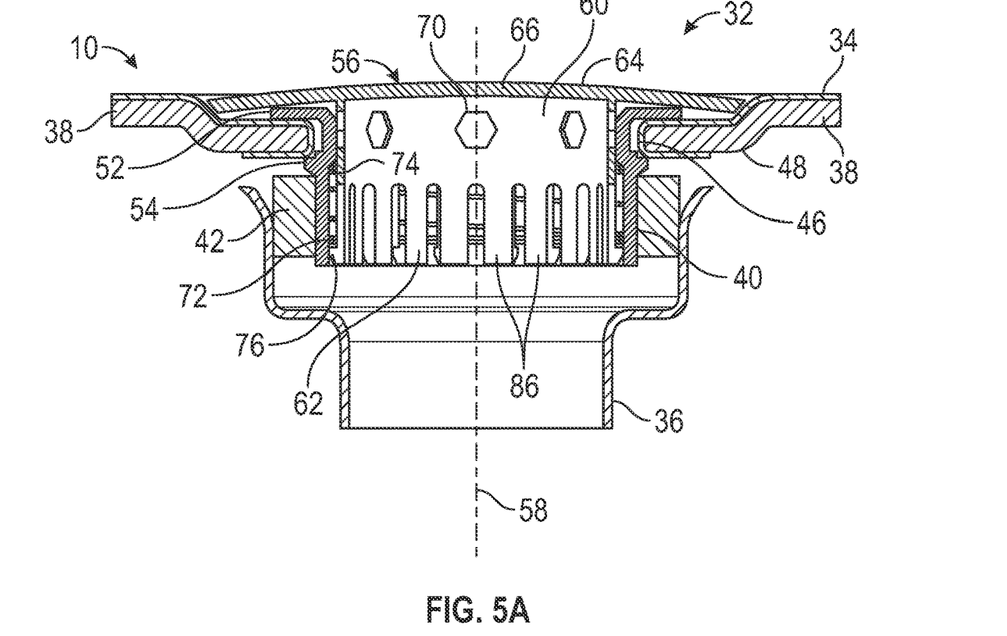
FIGS. 5A and 5B illustrate a cross-sectional view of an embodiment of a pressure relief valve.
Figure 5B:
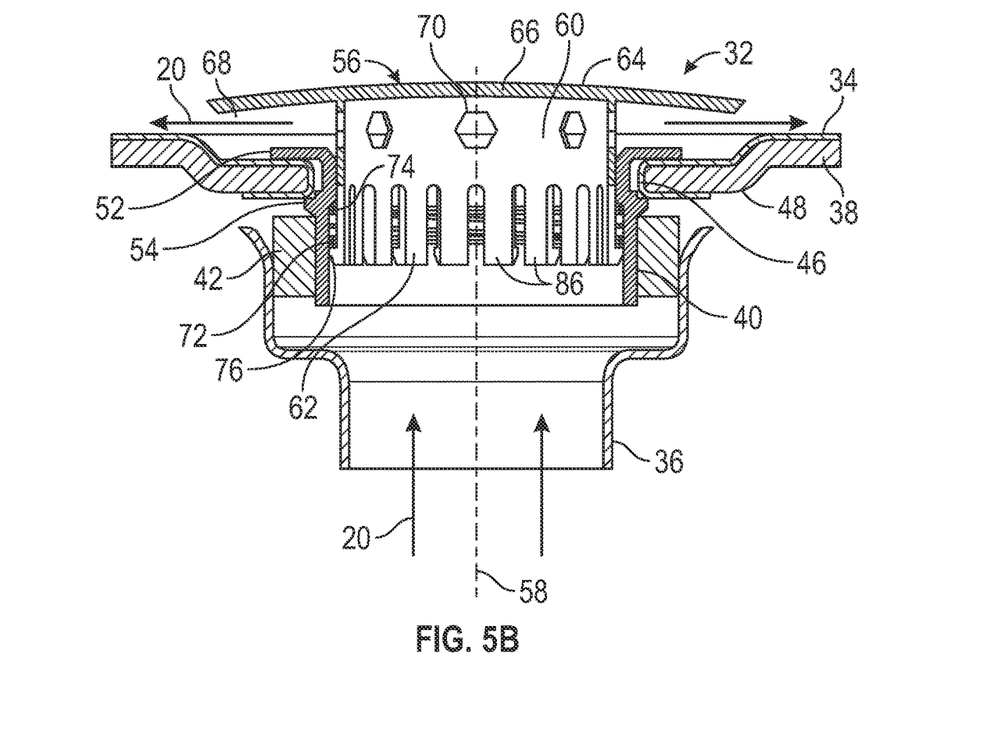
Figure 6:
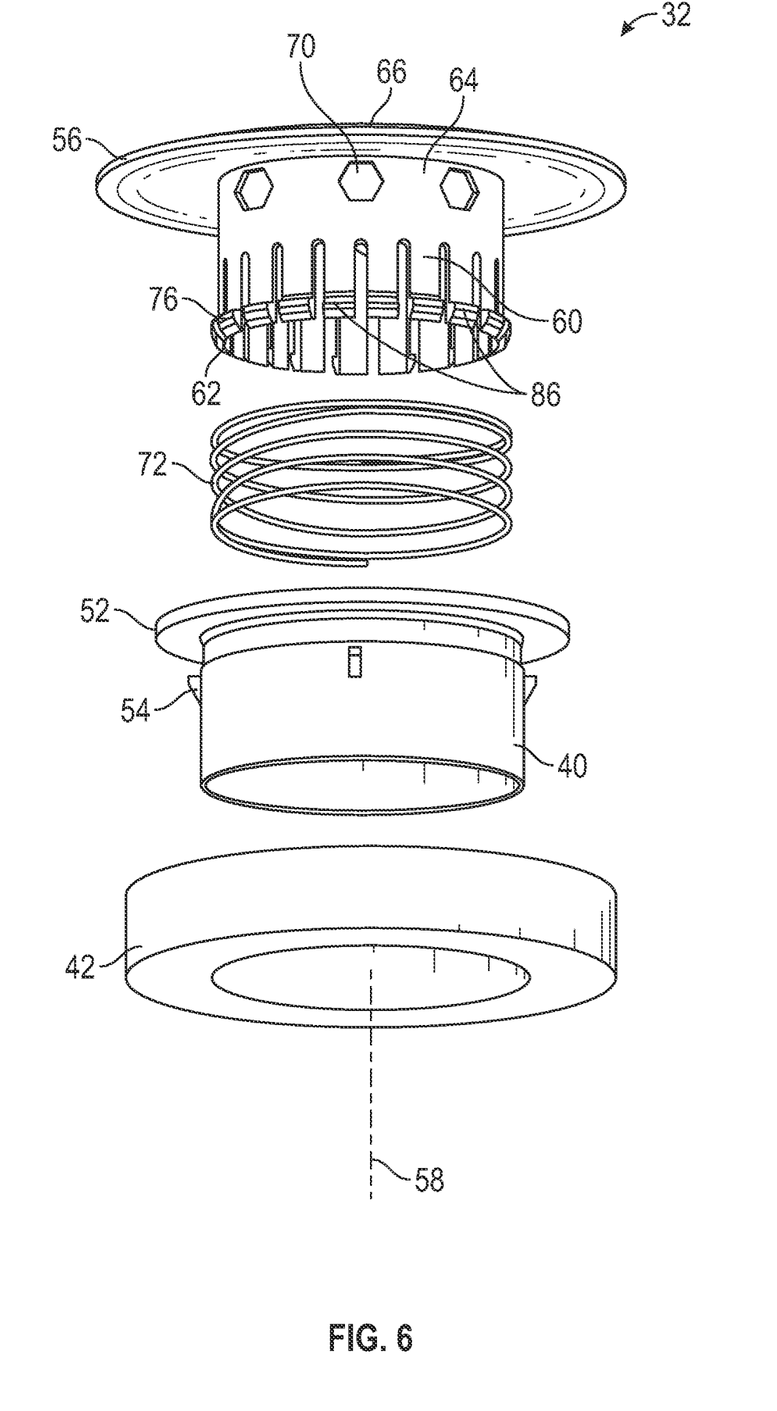
FIG. 6 is a partially disassembled view of an embodiment of a pressure relief valve.

Referring now to the cross-sectional views of FIGS. 5A and 5B, and the disassembled view of FIG. 6, the pressure relief valve 32 is installed to or thru a top pad 38 of the instrument panel 10, which at one side defines the top surface 34 of the instrument panel 10. The pressure relief valve 32 includes a housing 40 connected to the secondary duct 36, which defines a flowpath for the airflow 20 through the pressure relief valve 32. In some embodiments, the connection between the secondary duct 36 and the pressure relief valve 32 includes a foam ring 42 or other seal element located between the two components. The foam ring 42 acts to seal the interface between the housing 40 and the secondary duct 36 to prevent leakage of the airflow 20 at the interface. In some embodiments, the housing 40 is installed from the top surface 34 through a pad opening 46 in the top pad 38 toward the secondary duct 36 located at a back surface 48 of the top pad 38. In some embodiments, the housing includes one or more of a housing lip 52 and a housing rib 54 extending radially outwardly from a valve axis 58 to retain the housing at the top pad 38. In some embodiments, the top pad 38 is disposed between the housing lip 52 and the housing rib 54 at the pad opening 46, such that the housing lip 52 is disposed at the top surface 34 and the housing rib 54 is disposed at the back surface 48.

A diffuser 56 is installed into the housing 40 and is movable along the valve axis 58, relative to the housing 40. The diffuser 56 includes a tubular diffuser body 60, which is open at a first end 62 and closed at a second end 64 defined by a diffuser cap 66. The diffuser body 60 includes a plurality of body fingers 86 that extend along the valve axis 58 and terminate at the first end 62. The body fingers 86 are flexible in a direction toward the valve axis 58, and facilitate installation of the diffuser 56 into the housing 40. In some embodiments, the diffuser cap 66 may be formed from a same material as the top pad 38 to improve the appearance of the pressure relief valve 32 in the instrument panel 10. In some embodiments, such as illustrated in FIGS. 5A and 5B, the diffuser cap 66 is convex relative to the top pad 38, while in other embodiments the diffuser cap 66 may be, for example, planar or concave. When the pressure relief valve 32 is in a closed position such as in FIG. 5A, the diffuser cap 66 rests on the top surface 34, and when the pressure relief valve 32 is in an opened position such as in FIG. 5B, the diffuser cap 66 is moved along the valve axis 58 such that a cap gap 68 is defined between the diffuser cap 66 and the top surface 34, allowing the airflow 20 to exit the diffuser 56 through one or more diffuser outlets 70 in the diffuser body 60. In some embodiments, the diffuser outlets 70 have a hexagonal opening as illustrated, while one skilled in the art will readily appreciate that the shape, number, cross-sectional area, and position of the diffuser outlets 70 may be varied to achieve a desired degree of pressure relief by allowing a selected portion of the airflow to flow through the diffuser outlets 70.

The pressure relief valve 32 is biased toward the closed position by a biasing element, which in some embodiments is a spring element 72 installed between a housing flange 74 and a diffuser flange 76. In the embodiments shown, the diffuser flange 76 in formed in each of the body fingers 86 defined in the diffuser body 60 and extend radially outwardly from the body fingers 86, relative to the valve axis 58. In the illustrated embodiment, the spring element 72 is a coil spring, but one skilled in the art will readily appreciate that other spring element configurations may be utilized. Further, the spring elements 72 may be selected or tuned depending on the threshold pressure of the airflow 20. When the pressure of the airflow 20 in the primary duct 30 exceeds the threshold, the biasing force of the spring element 72 is overcome and the diffuser 56 moves from the closed position to the opened position allowing the airflow 20 to exit the pressure relief valve 32 through the diffuser outlets 70.

Figure 7A:
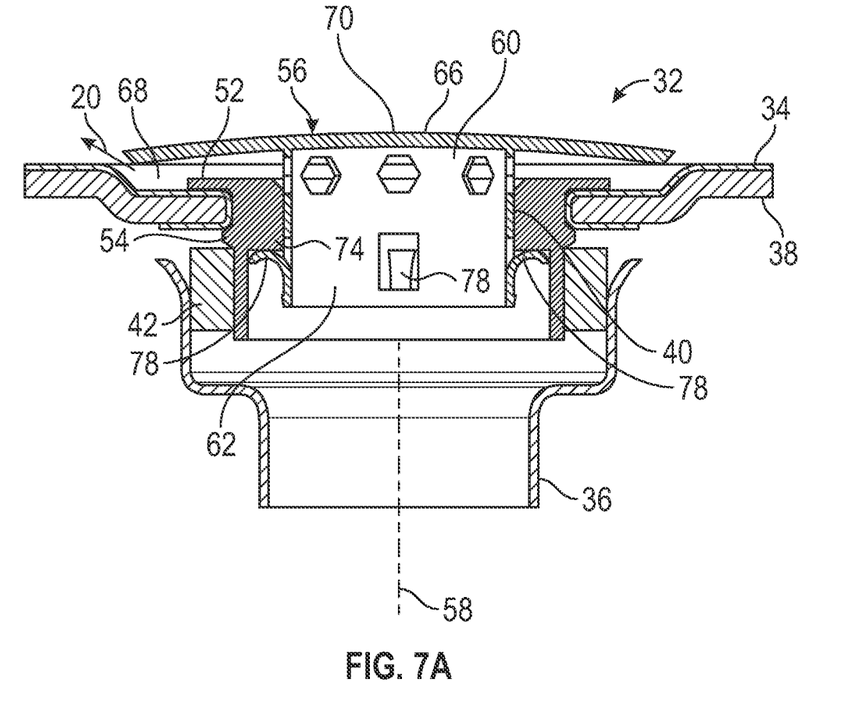
FIGS. 7A and 7B are partial cross-sectional views of another embodiment of a pressure relief valve.
Figure 7B:
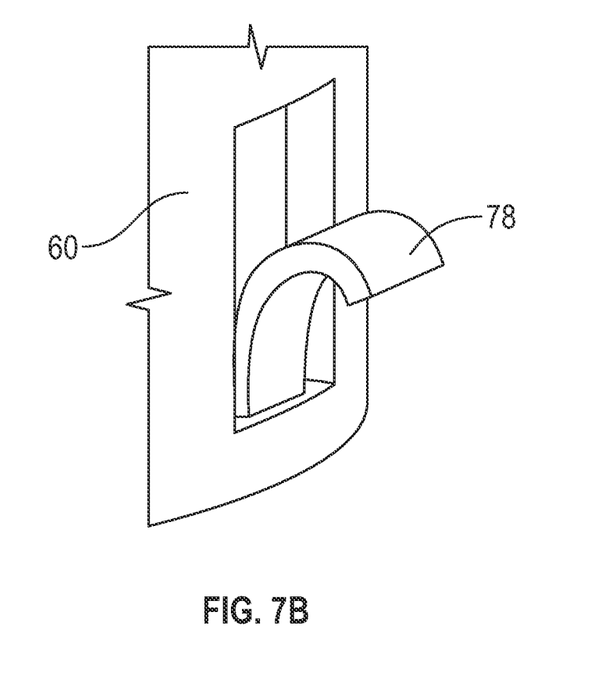
Figure 8A:
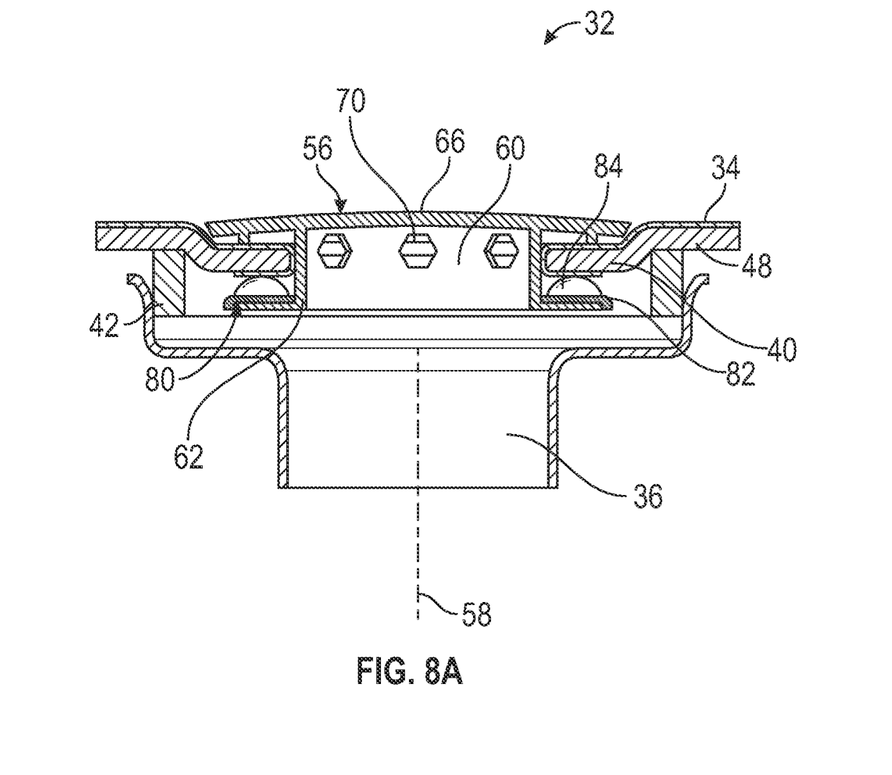
FIGS. 8A and 8B illustrate yet another embodiment of a pressure relief valve.
Figure 8B:
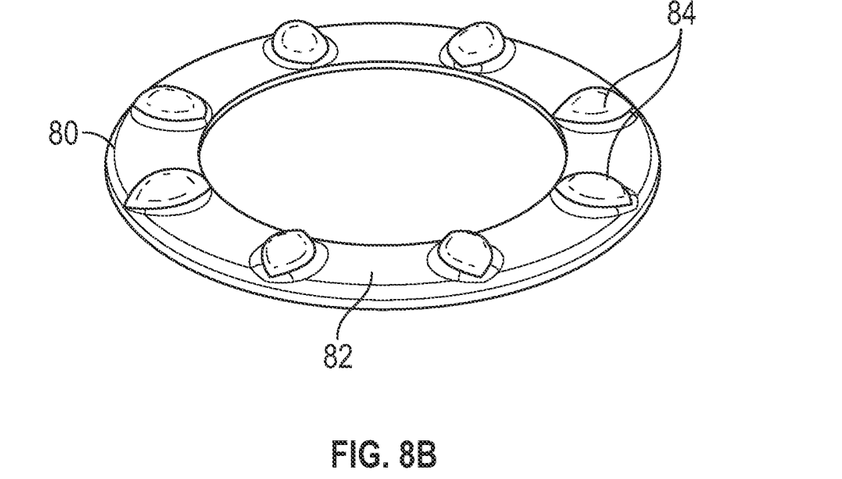

In other embodiments, such as in FIGS. 7A and 7B, the biasing element is a flexible biasing tab 78 extending curvilinearly outwardly from the diffuser body 60 and interactive with the housing flange 74. When the pressure in the primary duct 30 exceeds the threshold, a biasing force of the biasing tab 78 is overcome, and the biasing tab 78 flexes, allowing the diffuser 56 to move along the valve axis 58 to the open position, as illustrated in FIG. 7A. In another embodiment, illustrated in FIGS. 8A and 8B, the biasing element is a biasing ring 80 installed to the diffuser 56. The biasing ring 80 includes a ring body 82 and one or more compressible protrusions 84 extending from the ring body 82 toward the back surface 48 of the top pad 38, such that the protrusions 84 are between the ring body 82 and the back surface 48, with the protrusions 84 biasing the diffuser 56 toward the closed position. When the pressure of the airflow 20 exceeds the threshold, the biasing force of the protrusions 84 is overcome and the diffuser 56 moves from the closed position to the opened position allowing the airflow 20 to exit the pressure relief valve 32 through the diffuser outlets 70.

The configurations disclosed herein including the pressure relief valve 32 allow for reduction in the airflow resistance in the HVAC system 12 and further allow for introduction of increased airflow into the occupant compartment 3 for faster conditioning of the occupant compartment 3 in some operating conditions, such as those requiring full capacity of the HVAC system 12. The configuration may also reduce air rush noises through the vent assembly 14.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A pressure relief valve of a heating, ventilation and air conditioning (HVAC) system of a vehicle, comprising:
   a housing configured for installation into a duct opening of a duct;

a diffuser installed into the housing and movable between a closed position and an opened position along a valve axis, the diffuser including:
   a tubular diffuser body having an inlet opening at a first end;
   a diffuser cap disposed at a second end of the tubular diffuser body to close the diffuser tubular body at the second end; and
   one or more outlet openings disposed between the inlet opening and the diffuser cap; and
a biasing element to bias the diffuser toward the closed position;
wherein when an airflow pressure in the duct exceeds a threshold, the airflow pressure urges the diffuser toward the opened position thus allowing an airflow to exit the pressure relief valve at the one or more outlet openings;
wherein the biasing element is disposed between the tubular diffuser body and the housing;
wherein the valve is configured to release the airflow from the one or more outlet openings into an occupant compartment of a vehicle.

2. The pressure relief valve of claim 1, wherein the biasing element is a spring.

3. The pressure relief valve of claim 1, wherein the biasing element is a flexible biasing tab extending from the tubular diffuser body and interactive with the housing.

4. The pressure relief valve of claim 1, wherein the biasing element is a biasing ring disposed between the housing and the tubular diffuser body having one or more compressible portions.

5. The pressure relief valve of claim 1, further comprising a seal ring operably connected to the duct and the housing.

6. A heating, ventilation and air conditioning (HVAC) system of a vehicle comprising:
   an HVAC unit;
   a primary duct operably connected to the HVAC unit;
   a vent operably connected to the HVAC unit and configured to convey an airflow from the HVAC unit into an occupant compartment of the vehicle via the primary duct; and
   a pressure relief valve located along the primary duct, the pressure relief valve configured to open when a pressure of the airflow in the primary duct exceeds a threshold to divert a portion of the airflow through the pressure relief valve, the pressure relief valve including:
     a housing installed into a duct opening;
     a diffuser installed into the housing and movable between a closed position and an opened position along a valve axis, the diffuser including:
       a tubular diffuser body having an inlet opening at a first end;
       a diffuser cap disposed at a second end of the tubular diffuser body to close the tubular diffuser body at the second end; and
       one or more outlet openings disposed between the inlet opening and the diffuser cap; and
     a biasing element to bias the diffuser toward the closed position;
wherein when the pressure of the airflow exceeds the threshold, the airflow urges the diffuser toward the opened position thus allowing the airflow to exit the pressure relief valve at the one or more outlet openings;
wherein the airflow is released from the pressure relief valve into an occupant compartment of the vehicle.

7. The HVAC system of claim 6, further comprising a secondary duct to connect the pressure relief valve to the primary duct.

8. The HVAC system of claim 6, wherein the pressure relief valve is disposed at a top pad of an instrument panel of the vehicle.

9. The HVAC system of claim 6, wherein the biasing element is a spring disposed between the tubular diffuser body and the housing.

10. The HVAC system of claim 6, wherein the biasing element is a flexible biasing tab extending from the tubular diffuser body and interactive with the housing.

11. The HVAC system of claim 6, wherein the biasing element is a biasing ring disposed between the housing and the tubular diffuser body having one or more compressible portions.

12. The HVAC system of claim 6, further comprising a seal ring operably connected to the duct and the housing.

13. A vehicle comprising:
   a vehicle body defining an occupant compartment inside the vehicle; and
   a heating, ventilation and air conditioning (HVAC) system, including:
     an HVAC unit;
     a primary duct operably connected to the HVAC unit;
     a vent operably connected to the HVAC unit and configured to convey an airflow from the HVAC unit into the occupant compartment of the vehicle via the primary duct; and
     a pressure relief valve located along the primary duct, the pressure relief valve configured to open when a pressure of the airflow in the primary duct exceeds a threshold to divert a portion of the airflow through the pressure relief valve, the pressure relief valve including:
       a housing installed into a duct opening;
       a diffuser installed into the housing and movable between a closed position and an opened position along a valve axis, the diffuser including:
         a tubular diffuser body having an inlet opening at a first end;
         a diffuser cap disposed at a second end of the tubular diffuser body to close the tubular diffuser body at the second end; and
         one or more outlet openings disposed between the inlet opening and the diffuser cap; and
       a biasing element to bias the diffuser toward the closed position;
wherein when the pressure of the airflow exceeds the threshold, the airflow urges the diffuser toward the opened position thus allowing the airflow to exit the pressure relief valve at the one or more outlet openings;
wherein the airflow is released from the pressure relief valve into an occupant compartment of the vehicle.

14. The vehicle of claim 13, further comprising a secondary duct to connect the pressure relief valve to the primary duct.

15. The vehicle of claim 13, wherein the pressure relief valve is disposed at a top pad of an instrument panel of the vehicle.

16. The vehicle of claim 13, wherein the biasing element is a spring disposed between the tubular diffuser body and the housing.

17. The vehicle of claim 13, wherein the biasing element is a flexible biasing tab extending from the tubular diffuser body and interactive with the housing.

18. The vehicle of claim 13, wherein the biasing element is a biasing ring disposed between the housing and the tubular diffuser body having one or more compressible portions.

19. The vehicle of claim 13, further comprising a seal ring operably connected to the duct and the housing.

* * * * *